INVENTOR:
ALOYSIUS JOHANNES BECKER
BY: Oswald H. Milmore
HIS ATTORNEY.

Aug. 31, 1954  A. J. BECKER  2,687,806
NONROTATABLE DISK FILTER WITH TIPPING TRAYS
Filed March 16, 1950  4 Sheets-Sheet 2

INVENTOR:
ALOYSIUS JOHANNES BECKER
BY: Oswald H. Wilmore
HIS ATTORNEY

Aug. 31, 1954  A. J. BECKER  2,687,806
NONROTATABLE DISK FILTER WITH TIPPING TRAYS
Filed March 16, 1950  4 Sheets-Sheet 3
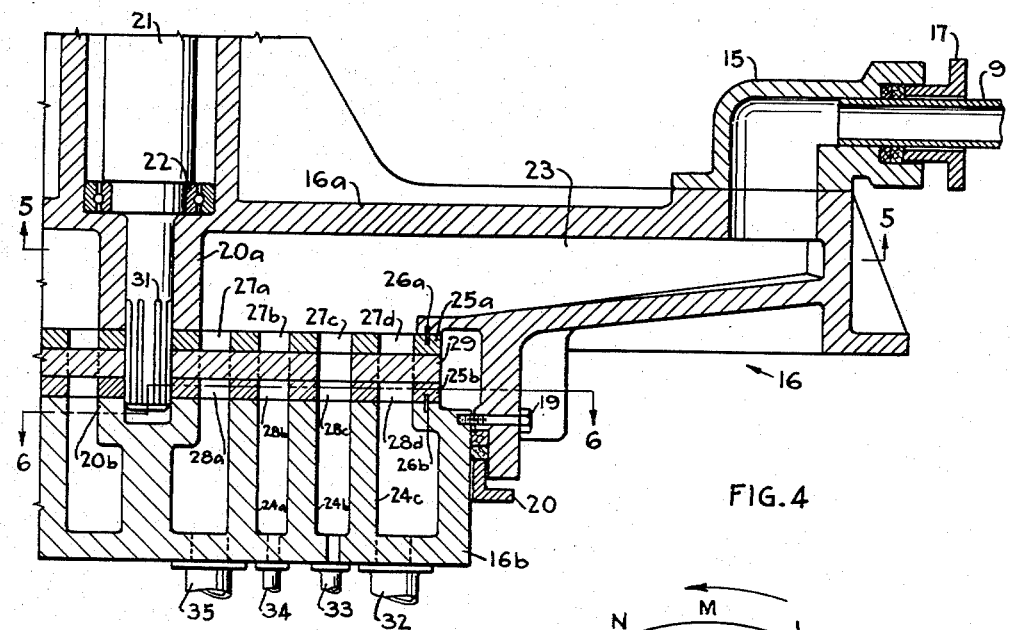
FIG. 4
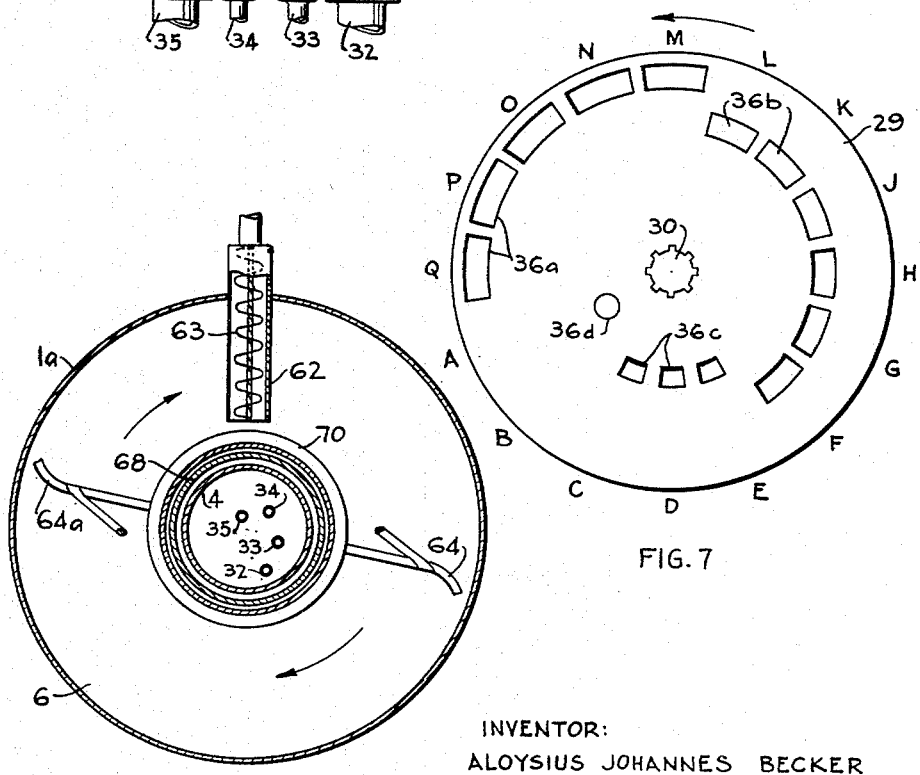
FIG. 7
FIG. 3
INVENTOR:
ALOYSIUS JOHANNES BECKER
BY: Oswald H. Milmore
HIS ATTORNEY Aug. 31, 1954    A. J. BECKER    2,687,806
NONROTATABLE DISK FILTER WITH TIPPING TRAYS
Filed March 16, 1950    4 Sheets-Sheet 4

INVENTOR:
ALOYSIUS JOHANNES BECKER
BY: Oswald H. Milmore
HIS ATTORNEY

Patented Aug. 31, 1954

2,687,806

UNITED STATES PATENT OFFICE 2,687,806

NONROTATABLE DISK FILTER WITH TIPPING TRAYS

Aloysius Johannes Becker, Hamburg, Germany, assignor to Shell Development Company, San Francisco, Calif., a corporation of Delaware Application March 16, 1950, Serial No. 149,947

6 Claims. (Cl. 210—196)

This invention relates to a filtering apparatus for separating a solid from a liquid, and is concerned particularly with a device provided with a plurality of filter trays which can be tipped about stationary, individual, substantially horizontal axes for discharging the filtered solids.

Horizontal filters are already known which have a plurality of trapezoid or sector-shaped filter trays which can be individually tipped about horizontal axes and are mounted for movement in a horizontal ring for successive passage beneath one or more fixed dispensing stations whereat the slurry to be filtered and, if desired, one or more wash liquids are supplied to the trays. Such trays are supported by hollow horizontal axles through which the filtrate is discharged into an effluent pipe. In some known devices several effluent pipes are successively connected to the hollow axle by means of a synchronously operated valve. Each tray is tipped at a point in its circuit, and compressed air may be supplied simultaneously through the hollow axle to dislodge the filter cake, which falls into a suitable receiver.

Such known devices are mechanically complex and require comparatively powerful motors to rotate the trays and their supporting structure because of the heavy weight of these parts and because such rotation is used also, through suitable engaging means, to tilt and to restore the trays to their filtering positions. Considerable mechanical shock and vibration is also set up which in some cases adversely affects the quality of the solids, such as wax crystals. Also, it is difficult to modify the sequence of operations and the durations of successive steps, such as main filtration and successive washings which are applied in the known devices.

It is an object of the invention to provide an improved horizontal filter having a plurality of filter trays which can be tipped to discharge solids but which otherwise remain stationary, and wherein the distributor head and distributing conduit or conduits for supplying to the trays the liquid to be filtered and, when used, the washing liquids, are rotatable about a vertical axis.

A further object is to provide an improved horizontal filter with a plurality of individually tippable filter trays which is of simple construction, is easy to operate, service and maintain, and wherein the rotatable parts for effecting rotation between the trays and the supply conduits requires but little power. Still other objects are to provide a filter which is relatively free from mechanical shock or vibrations and which can be readily altered to perform different filtering operations or to vary the durations of successive washings or dispositions of filtrates.

Another object is to provide an improved distributing valve in a horizontal tray filter of the type described having an operating cycle wherein each of several pipes, e. g., a main filtrate effluent pipe, one or more washing liquid effluent pipes and/or a compressed air pipe, is in turn connected successively to each of the llter trays, said valve being operable in synchronism with the distributing head, wherein the cycle of operation, i. e., the number of such pipes involved in the cycle, the sequence in which such pipes are connected to the filters, and/or the proportion of the cycle during which the several pipes are connected to each filter tray, can be easily altered.

Certain specific objects are to provide an improved distributor head for supplying the liquid to be filtered and one or more wash liquids and distributing such liquid or liquids uniformly among the individual filter trays; to provide a simple and effective operating means for tilting the filter trays sequentially; and to arrange the device to collect the discharged solids into a single discharge trough.

Briefly, according to this invention the filter trays are constructed in the usual way, each tray being formed as an upwardly open pan adapted to hold liquid having a filter or sieve plate spaced from the tray top and on which the filter cake forms from the solid substance suspended in the feed liquid. Each tray has a filtrate collector beneath the filter plate from which filtrate is discharged through a communicating conduit. The trays may have any outline, preferably trapezoidal or forming sectors of an annulus, and are mounted to form an annular series around a vertical center line; they are pivotally supported in a fixed housing for tipping about stationary, substantially horizontal axes. While the pivot axes may have any orientation it is convenient to dispose them more or less radially with respect to the vertical center line. In the preferred construction the trays are fixed to rotatable, hollow axles which have rotary packed joints with respect to stationary pipes and serve also as the said communicating conduits. The communicating conduits, e. g., the hollow axles, are intermittently connected by means of a distributing valve to one or more liquid effluent and/or pressure gas supply pipes, the distributing valve being operated to connect the communicating conduits successively to the several pipes in a predetermined cycle. Each filter tray has its communicating conduit similarly connected to pass through the same cycle of connections, but the cycle of each tray lags that of its adjacent tray in the series.

A distributing head, rotatable about the vertical center line above the filter trays supplies the mixture to be filtered and also the further liquids, e. g., washing liquids or solvents, to the filter trays in succession.

The distributing head preferably has a number of concentric troughs above each of which there is a stationary supply conduit. Each annular trough supplies liquid to a radial distributing conduit which rotates with the head and has an outlet above the filter trays, the outlets of the several conduits being angularly displaced to supply liquids to the filter trays in the desired sequence and at the desired intervals. Each supply conduit may have an adjustable flow control valve or may have its orifice so designed as to regulate the rate of flow. In this manner continuous feed of the various liquids is made possible.

Below the ring of trays there is a common, stationary bottom which may be flat, either horizontal or inclined, or conical for receiving the solids discharged from the filters, and which may be optionally provided with a transport device to collect the solids. For example, a rotary scraper can be installed above the bottom, arranged to move the solids into a radial trough or groove in the bottom which is, in turn, provided with a transporting device, such as a conveyor screw to remove the solids from the apparatus.

The filter trays in this apparatus being stationary apart from their tipping movements, only a relatively small amount of energy is required to drive the rotating distributing head and distributing valve in comparison to the known apparatus in which the trays move circumferentially and the power required intermittently for tilting and restoring the trays is taken off the drive which causes the said circumferential movement. The combined weight of the distributing head and of the moving parts of the distributing valve is considerably less than that of the filter trays and these consume power at a uniform rate.

As in the filter according to the invention no use can be made of the rotating movement of the filter trays to bring about tipping and restoration movements, special tray actuating elements are provided for this purpose. These elements may be of any type and may, for example, comprise automatically controlled pneumatically operated cylinders and pistons coupled to the filter trays; mechanical actuation from or synchronously with the distributing head is, however, also possible.

The flow connection between the filter trays and the distributing valve for connecting the trays to the various liquid effluent and/or gas pressure conduits can be made in any desired manner, and the following is presented by way of illustration: The part of the filter tray axle nearer the vertical center line is hollow and communicates with the tray through openings in the tray bottom. This axle part is connected through a coupling in the form of a rotary packed joint, to a conduit to place the tray in continuous communication with one of several sectors of the distributing valve case which sectors are situated about the vertical center line of the filter. The bottom of the valve case has several annular openings located concentrically at different radii from the center line and connected to the various pipes. A rotatable control disc within the valve case has a plurality of openings at different radii and establishes communication between the various sectors and the pipes in the proper sequence upon rotation; this control disc is replaceable with one having a different arrangement of openings to permit the cycle of operation, e. g., sequence or duration of the connections to be altered.

While the distributing head and the distributing valve are preferably fitted on a common shaft for synchronous operation, the scraper can be actuated by a separate drive, as it is not necessary for the scraper to run synchronously with the other devices mentioned. The tray actuating elements for tipping the trays must, of course, be operated synchronously with the distributing head and distributing valve; when not mechanically driven by the same drive, some synchronizing control element must be provided.

The filter will be described in greater detail with reference to the accompanying drawings forming a part of this specification and showing an illustrative embodiment of the invention, wherein:

Fig. 1 is a vertical sectional view through the filter, parts being shown in elevation;

Figs. 2 and 3 are horizontal sectional views taken on section lines 2—2 and 3—3, respectively, of Fig. 1, drawn to a reduced scale, showing the filter trays and the bottom, respectively;

Fig. 4 is an enlarged partial vertical cross-section of the distributing valve;

Figs. 5 and 6 are horizontal sectional views through the valve case taken on lines 5—5 and 6—6 on Fig. 4;

Fig. 7 is a plan view of the control disc; and

Figure 1:
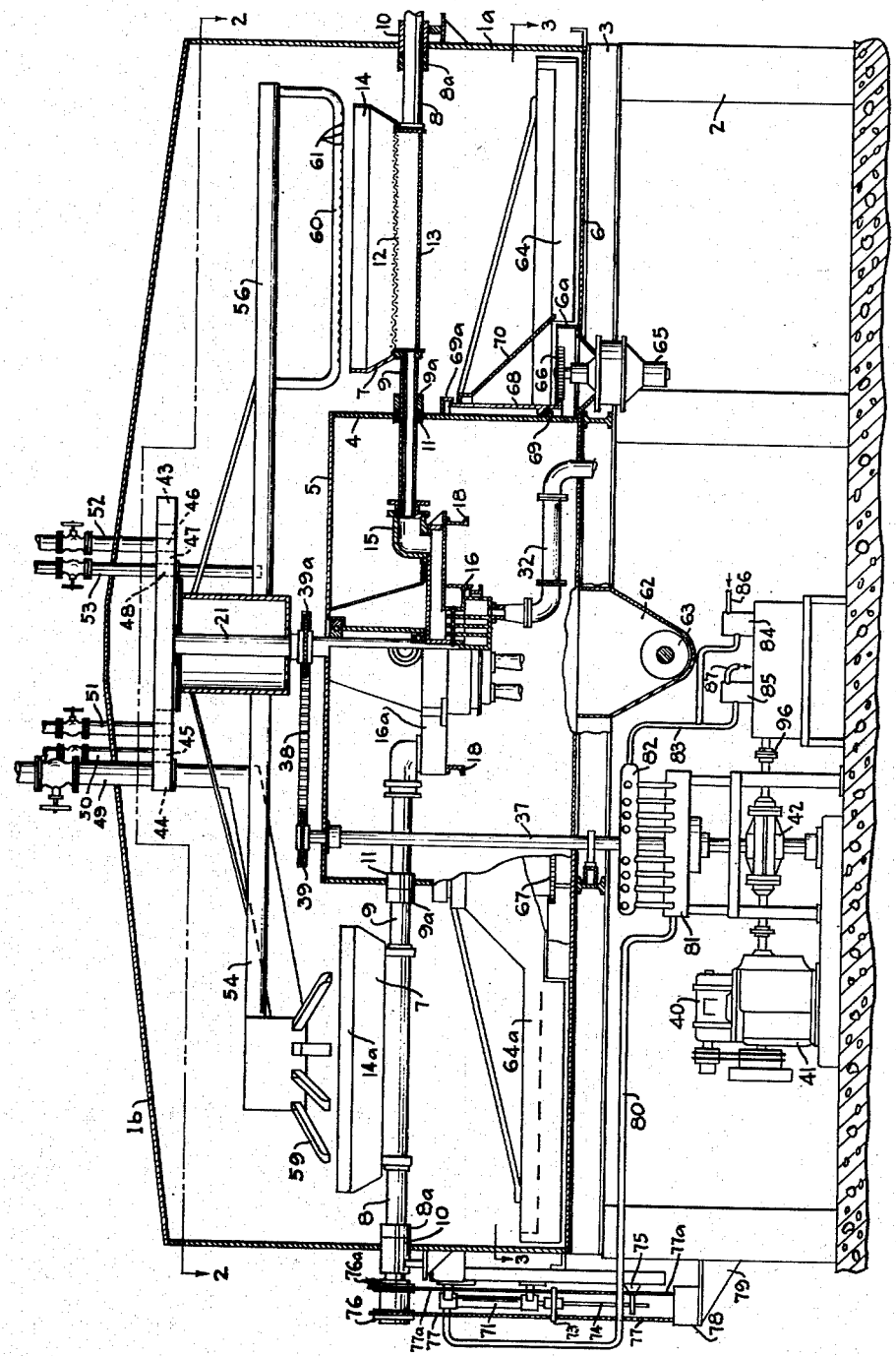

The apparatus shown in the drawing is particularly intended for separating paraffin wax from a lubricating oil to which a diluent and a thinner have been added. The cake of wax formed on the sieve plate of each filter tray is washed out a few times after the oil has been run off in order to free the solid paraffin wax from its adhering liquid, the washing fluid being drawn off in vacuo and collected separately. After the filter cake has been washed out sufficiently, the filter tray is tipped and compressed air is admitted underneath the sieve plate to remove the filter cake. The construction of a filtering apparatus according to the invention must naturally take into account the material to be dealt with and the treatment to which it is to be subjected, and can accordingly differ in certain details from the design for the special application described below.

The apparatus represented in the drawings is for the most part enclosed by a stationary cylindrical housing wall 1a having a roof 1b and supported from columns 2 through I beams 3. An inner cylindrical stationary wall 4 is similarly supported and has a cover 5. A flat annular floor 6 is located in the space between the concentric walls and has a vertical annular flange 6a at its inner edge. A plurality of sector or trapezoid-shaped filter trays 7 are mounted in this annular space above the floor to form an annular series and are supported by means of individual axles 8 and 9 which are rotatably supported in stationary bearings 10 and 11, respectively, fixed to the walls 1a and 4. These axles are seen to be rotatable about stationary axes which are radial with respect to the filter as a whole. The trays can thereby be tipped to any desired angle, e. g., 90° or 180°, from the normal upright positions shown in Fig. 1. Bushings 8a and 9a retain the axles in axial alignment, and the axles 8 extend outwardly beyond the wall 1a for connection to the tipping mechanism which will be described hereinafter.

Each of the filter trays, of which sixteen are indicated by way of example, is of like construction and only one of them will be described in detail. Each tray is in the form of an upwardly open pan adapted to contain liquid and has a filter or sieve plate 12 spaced somewhat above the imperforate bottom 13 and a rim 14 extending upwardly from the filter plate to retain a body of liquid thereon and forms a filtrate-collecting vessel. The rim 14 on one side of each tray may overlap the adjacent tray as indicated at 14a in Figs. 1, 2 and 8, to prevent spillage of liquid between trays onto the floor. The filter plate 12 is preferably substantially horizontal, as shown, but this is not always essential. The axle 9 is tubular and has its bore in communication with the space between the filter plate and the tray's bottom. The radially inner end of the axle 9 enters an enlarged opening in an elbow pipe 15 which is fixed to the upper case section 16a of a central distributing valve 16. A packing gland 17 seals the axle 9 rotatably to the pipe 15.

Figure 5:
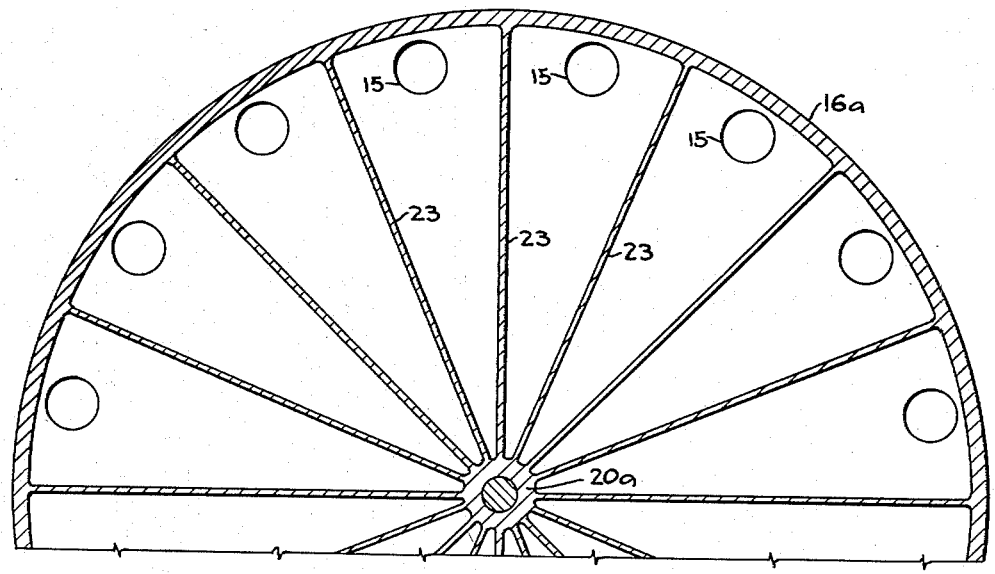
Figure 6:
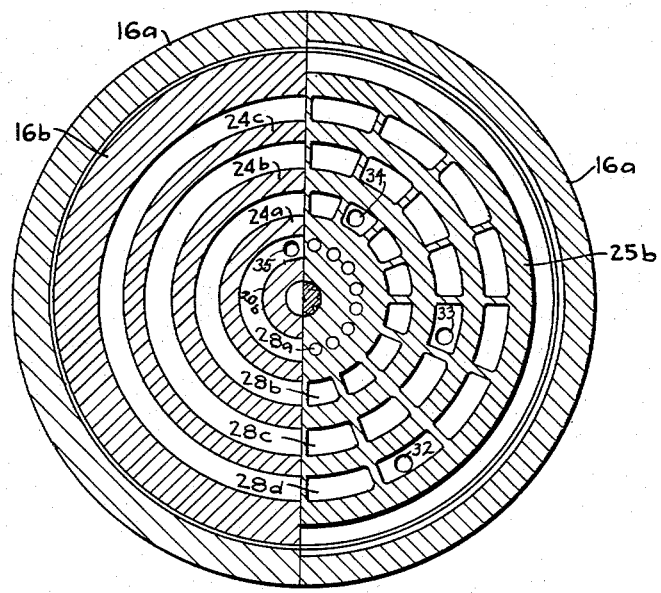

The distributing valve 16 has a stationary case comprising an upper section 16a supported on channel beams 18 and a lower section 16b suspended from the upper section by radial screws 19 and sealed thereto by a packing gland 20. Inner annular walls 20a and 20b provide a central cylindrical well for the main operating shaft 21 which is guided with respect to valve casing by a roller bearing ring 22. As shown in Fig. 5, the upper casing section is sub-divided by radial partitions 23 into a plurality of radial, sector-shaped chambers constituting radial flow passages, herein for brevity referred to as sectors, corresponding in number to the number of filter trays and elbow pipes 15. Each sector is in continuous communication with one elbow pipe. The lower part of the case has three concentric vertical walls 24a, 24b, and 24c to form four annular channels as shown; these channels constitute annular flow passages. Stationary annular plates 25a and 25b cover the bottom of the upper section and the top of the lower section of the valve casing, respectively, and are held against rotation by means of pins 26a and 26b. Four annular rings of holes at radii corresponding to the annular channels in the lower section are provided in each of these plates. The holes in each ring are angularly positioned so that one hole of each ring is opposite each of said sectors in the upper section. Thus, the plate 25a has holes 27a, 27b, 27c, and 27d, communicating with each sector; these holes do not extend across the partitions 23, so that the sectors are isolated from each other. Four annular rings of holes 28a, 28b, 28c and 28d are formed in plate 25b immediately beneath the holes in plate 25a and in communication with the four annular chambers in the lower part of the valve casing. A circular control disc 29 is interposed between the plates 25a and 25b and may be rotated relatively thereto by means of the main shaft 21 to which it is secured by radial projections 30 which enter longitudinal grooves 31 on the shaft; it constitutes a progressively movable control member. Liquid effluent pipes 32, 33 and 34 communicate with the three outer annular channels and a compressed air pipe 35 is connected to the innermost chamber as shown in Fig. 6. In Fig. 4 these pipes are shown in the same plane, which is inexact but facilitates understanding of the arrangement.

The control disc 29 has a plurality of openings 36a, 36b, 36c, and 36d disposed at different radii from the center corresponding to the rows of holes in the disc 25a. In the preferred arrangement shown there is not more than one opening in any one radial segment of the disc; moreover, the innermost opening 36d is displaced from the openings in groups 36a and 36c by a sufficient angle to prevent any part of opening 36d from being in registry with a hole in the plates 25a and 25b simultaneously with the registry of any other opening in the control disc with a hole in the same sector. In this way blow-by of compressed air into the effluent pipes 32—34 is obviated. It is evident that each of the sectors of the upper section of the valve case will be connected to only one of the four annular chambers in the lower part at one time except that, in the case of the rows 36a—36c, two annular chambers may be momentarily connected to the same sector when the last opening in a row is passing out of registry with a hole in the stationary plate while the first opening in the next row is moving into registry with another hole in the same sector. The disc 29 is rotated by the shaft 21, which is driven at the required speed from the driving shaft 37 by means of a sprocket chain 38 and sprocket wheels 39, 39a which are of equal size. Shaft 37 is driven by an electric motor 40 through reduction gearing 41 and a worm drive 42.

The shaft 21 carries the distributing head 43 on its upper end. This head comprises a tray with a number of annular walls forming open troughs 44, 45, 46, 47 and 48, which form rotatable liquid reservoirs and above which are mounted stationary supply pipes. Supply pipe 49, for the mixture to be filtered, supplies the outermost trough 44 and supply pipes 50, 51, 52 and 53 supply washing fluid to the other troughs. Each of these supply pipes may be provided with a valve as shown. A radial distributing conduit is connected to the bottom of each of the troughs for rotation therewith and forming a part of the head. These conduits 54, 55, 56, 57 and 58 (see Fig. 2) are angularly displaced each from the others as shown in Fig. 2. Thus, conduit 54, communicating with trough 44, supplies the oil and wax to the filter trays and may optionally have additional discharge chutes 59 while the other four distributing conduits are provided with depending, stirrup-shaped pipes 60 having perforations 61 as shown in Fig. 1 for spraying washing fluid over the trays.

The sequence of the various actions can best be explained by means of Fig. 2, in which the sixteen filter trays are indicated by A–Q. These letters are also shown in Fig. 7 for the position of the distributing head indicated in Fig. 2, it being understood that the disc 29 and head move in unison. The direction of rotation is shown by the arrows. The filter tray A has just been tipped, emptied, returned to its original position, and is now ready to take a fresh charge. B is shown in the tipped position; C is undergoing the fourth and last washing-out, D and E the third, F, G and H the second and J, K and L the first washing-out. In trays M to Q the oil is draining from the filter cake. It will be clear that the stages through which one filter tray passes are represented by the respective positions of the filters A–Q, but in reverse order: Q–A. The distributing valve 16 works synchronously with the supply of the various liquids, in such a manner that the following takes place: at B, supply of compressed air from pipe 35 is forced into the space beneath the filter plate to disengage and remove the filter cake; at C–L, removal of washing fluid by suction in, for example, two stages, whereby the washing fluid of the first and second washings is removed through the effluent pipe 33 separately from that employed in the third and fourth washings which is removed through pipe 34; at M–Q removal of the liquid originally present in the mixture in progress, this being discharged through pipe 32. It is assumed that vacuum suction is applied to effluent pipes 33 and 34 by suitable means, not shown, to remove the washing fluid in order to accelerate the process.

Figure 2:
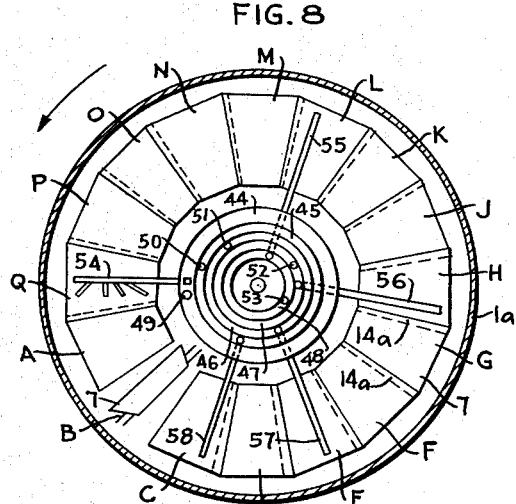

Each filter tray discharges its contents on to the place immediately beneath it on the bottom 6 of the housing 1 (see Figs. 1 and 3). In order to collect this material and conduct it away, the bottom is constructed with a localized radial depression or trough 62 in it, in which a conveyor screw 63 is fitted, and a two-armed scraper 64, 64a rotates over the floor, which scraper may be driven by a separate motor 65, for example by means of a toothed wheel 66 meshing with an annular gear rack 67 on a drum 68 which is rotatably supported by the cylindrical wall 4 at 69 and 69a and carries the scrapers 64, 64a. A deflector cone 70 on the drum 68 extends outwardly beyond the flange 6a to deflect wax onto the floor 6. The conveyor screw 63 may be driven by a separate motor, not shown.

Figure 8:
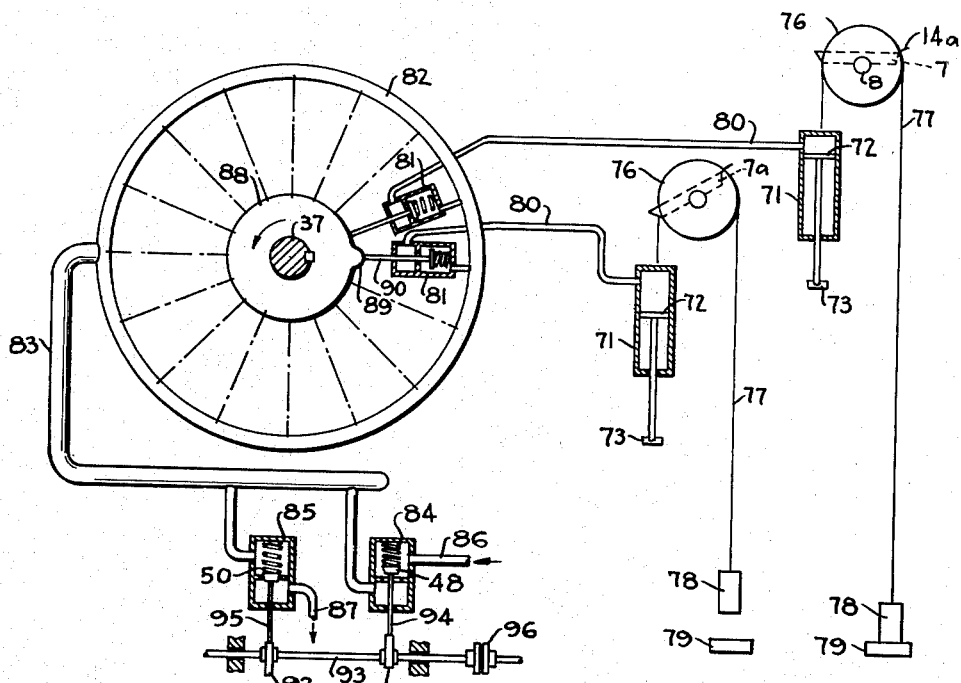
Fig. 8 is a diagrammatic view of the pneumatic installation for tipping the filter trays.

As previously stated, the filter trays can be tipped by any suitable mechanism, and a pneumatic system having a separate pneumatic motor for each tray is schematically indicated by way of illustration in Fig. 8, parts being shown in Fig. 1. Each motor comprises a cylinder and piston combination. On the outer housing 1a near each bearing 10 is mounted a vertical cylinder 71 within which is a piston 72, the rod of which carries a crosshead 73 beneath the cylinder and is guided by an extension 74 which is reciprocable within a bracket 75. Each axle 8 carries a pair of adjustably secured sprocket wheels 76, 76a over which sprocket chains 77, 77a are passed. One end of each chain is fixed to the crosshead 73 and the other end is fixed to a weight 78. The chains are arranged so that the weight tends to rotate the axle 8 toward its normal horizontal position, and the sprocket wheels are oriented on the axle to bring the trays to this horizontal position when the weight comes to rest on a platform 79. The weight further pulls the piston up, the lengths of the chains being suitably adjusted. Compressed air may be admitted to the top of the cylinder through a conduit 80, thereby forcing the piston and its crosshead down, rotating the wheels 76, 76a, and lifting the weight; this rotates the axle 8 and tips the filter tray, a partially tipped tray being indicated at 7a in Fig. 8. When the air from the cylinder is vented through the conduit 80 the weight descends and raises the piston, thereby also restoring the tray to its horizontal position.

The above-described tipping action must happen to each filter tray in succession in the course of one revolution of the shaft 21; this makes it necessary to admit and discharge compressed air from each of the sixteen cylinders 71 in turn. For this purpose each of the sixteen conduits 80 (of which only one is shown in Fig. 1 and two in Fig. 8) is connected to a separate valve 81. Each valve is further connected to a common manifold pipe 82 which has parallel connections by means of a conduit 83 to a pair of valves 84 and 85. The valve 84 is the pressure intake valve and is connected by a compressed gas conduit 86 to a source of compressed air, not shown; the valve 85 is the air discharge valve and is connected to a vent, embodied here by a discharge pipe 87. All sixteen valves 81 and the valves 84 and 85 are spring loaded and normally closed. The valves 81 are arranged as a circle about a cam disc 88 which is driven synchronously with the shaft 21 in any suitable manner and constitutes an operating member. Thus, the cam disc may be keyed to the shaft 37 which rotates at the same speed as the shaft 21. The cam surface is circular for the greater part and has a hump 89 extending over an arc less than one-sixteenth of a circle, e. g. about 18°. The edge of the cam disc engages the ends of the valve rods 90 and actuates them in succession to open the respective valves and connect the respective conduits 80 to the manifold 82 and conduit 83. Each valve 81 is closed before the valve adjacent thereto is opened by the cam disc. During the time that a valve 81 is open, valve 84 is first opened and then closed, and then the valve 85 is first opened and then closed, so that the pressure in the relevant cylinder 71 first rises and then falls, resulting in the tipping and restoring movements of the corresponding filter tray. The valves 84 and 85 are opened and closed at the correct times by cams 91 and 92 keyed to a shaft 93 and cooperating with the valve rods 94, 95. The shaft 93 rotates a multiple of the number of revolutions of the shaft 21 equal to the number of filter trays; thus, in the case illustrated, it rotates sixteen times as fast as the shaft 21 and cam disc 88. This relation is conveniently effected by using a sixteen to one reduction in the worm gear 42 and coupling the shaft 93 directly to the worm through a clutch 96.

The time in which the filter trays complete a cycle of operations can be altered by varying the speed of the input to the reduction gearing 42, for example, by changing the speed ratio in reduction unit 41. Changes can further be made in the different stages of the cycle by altering the mutual positions of the radial distributing conduits which supply the mixture to be filtered and the washing fluids to the filter trays, and, if desired, in combination with such alteration by substituting a control disc 29 which has its openings 36a—36d arranged in a different manner. As regards the control disc, the apparatus can be constructed so as to make the removal and replacement of the disc relatively simple. This is effected by removing the screw 19 and gland 20, dropping the lower part of the valve case, and lowering the valve control disc, which slides vertically on the shaft 21.

I claim as my invention:

1. Filtering apparatus for separating a solid from a liquid comprising, in combination: a stationary supporting structure; a plurality of filter trays situated on said structure in an annular series about a vertical axis, each tray having a filter plate and a bottom forming a closed filtrate-collecting vessel; an individual pivotal support for each tray supporting the respective tray from said structure for rotation about a substantially horizontal axis that is fixed in relation to said structure, whereby each tray can be tipped individually about its axis for discharging solids from the filter plate thereof; solids-collecting means disposed beneath all of said trays for receiving solids discharged from the trays; distributing means for supplying liquid to be filtered to the trays of said series in succession; a distributing valve having a first series of separate chambers, corresponding in number to the number of trays, each said chamber being connected individually to a separate one of said filtrate-collecting vessels, and a second series of chambers connected to different pipes, said valve having a progressively movable control member for connecting in turn each chamber of the second series successively to the chambers of the first series; drive means interconnecting said control member and said distributing means for operation in synchronism; a pneumatic motor for each of said trays drivingly connected thereto for tipping the respective tray about the said fixed horizontal axis thereof; a compressed gas conduit connected to each said pneumatic motor; valve means connected in said compressed gas conduit for admitting gas from said conduit to said pneumatic motors in succession for sequential tipping of the trays, said valve means in the gas conduit having a progressively movable operating member; and drive means interconnecting said operating member with said distributing means for operation in synchronism.

2. The combination according to claim 1 wherein each pneumatic motor comprises: a cylinder and a piston therefor one of which is fixed to the supporting structure and the other of which is connected to a pivotally movable part of the corresponding filter tray, said compressed gas conduit being connected to said cylinder for effecting relative movement between the piston and cylinder and turning the filter in one direction when compressed gas is admitted into the cylinder; and means applying a yieldable force to a part of the filter tray urging the filter tray to turn in the opposite direction for returning the filter when said compressed gas is removed from the cylinder.

3. The combination according to claim 1 wherein each pneumatic motor is of the type having two positions for holding the respective filter tray in tipped and horizontal positions when gas under pressure is admitted thereto and vented therefrom, respectively, and said valve means comprises: a first series of valves, one for each pneumatic motor, said valves having resilient means normally holding them closed, one side of each valve being connected individually to a separate pneumatic motor; a common manifold connected to the other side of each valve; and a second series of two valves the first of which is interposed between said compressed gas conduit and the said manifold and the second of which is connected to a vent for the discharge of compressed gas; said operating member of the valve means including an actuator for opening the valves of the said first series in synchronism with the said distributing means so that only one valve is open at one time, and an actuator for successively operating the valves of the second series during each period that a valve of the first series is open so that said first valve is first opened and closed and thereafter the second valve is opened and closed.

4. Filtering apparatus for separating a solid from a liquid comprising, in combination: a supporting structure; a plurality of filter trays situated on said structure in an annular series about a vertical axis, each tray having a filter plate and a bottom forming a closed filtrate-collecting vessel; an individual pivotal support for each tray supporting the respective tray from said structure whereby each tray can be tipped individually for discharging solids from the filter plate thereof; solids-collecting means disposed beneath said trays for receiving solids discharged from the trays; distributing means for supplying liquid to be filtered to the trays in said series in succession; a distributing valve casing having in one end thereof a plurality of separate radial flow passages and in the other end thereof a plurality of separate annular flow passages, said passages being open toward each other; a rotatable control disc interposed between said radial and annular passages for shutting off communication between them, said disc having a series of openings at different radial distances from the center of the discs corresponding to the radii of said annular passages and at different angular orientations for successively establishing flow communication between the annular passage in registry with the respective opening and each of the radial flow passages in succession; means for rotating said control disc in synchronism with said distributing means for operation in synchronism; individual conduit means interconnecting each of said radial passages individually to one of said filtrate collecting vessels in the filter tray; and a separate pipe communicating with each of said annular flow passages.

5. The filtering apparatus according to claim 4 wherein the valve casing is made of two end sections containing the said radial and annular passages, respectively, and is provided with means holding said sections detachably together, said control disc being held between said sections when assembled, and whereby the control may be readily removed by removing one of said casing sections to expose the control disc.

6. The filtering apparatus according to claim 5 wherein the said means for rotating the control disc is an axial shaft extending through at least one of said casing sections and having an axially slidable, non-rotative connection with the control disc.

References Cited in the file of this patent

UNITED STATES PATENTS

| Number | Name | Date |
|---|---|---|
| 892,275 | Leslie | June 30, 1908 |
| 978,381 | Kier | Dec. 13, 1910 |
| 1,028,789 | Rothwell | June 4, 1912 |
| 1,106,836 | Pettis | Aug. 11, 1914 |
| 1,284,347 | Howson | Nov. 12, 1918 |
| 1,698,002 | Pink | Jan. 8, 1929 |
| 1,760,244 | Lykken | May 27, 1930 |
| 2,013,634 | Norquist | Sept. 3, 1935 |
| 2,110,462 | Coberly | Mar. 8, 1938 |
| 2,188,840 | McCue | Jan. 30, 1940 |
| 2,352,330 | Lee | June 27, 1944 |
| 2,588,976 | Fuhrmeister | Mar. 11, 1952 |